Oct. 1, 1929.                    C. H. SHAFFER                    1,730,248
                                 LAWN SPRINKLER
                              Filed Feb. 15, 1927                2 Sheets-Sheet 1

Inventor
Charles H. Shaffer
By Frank E. Liverance, Jr
Attorney.

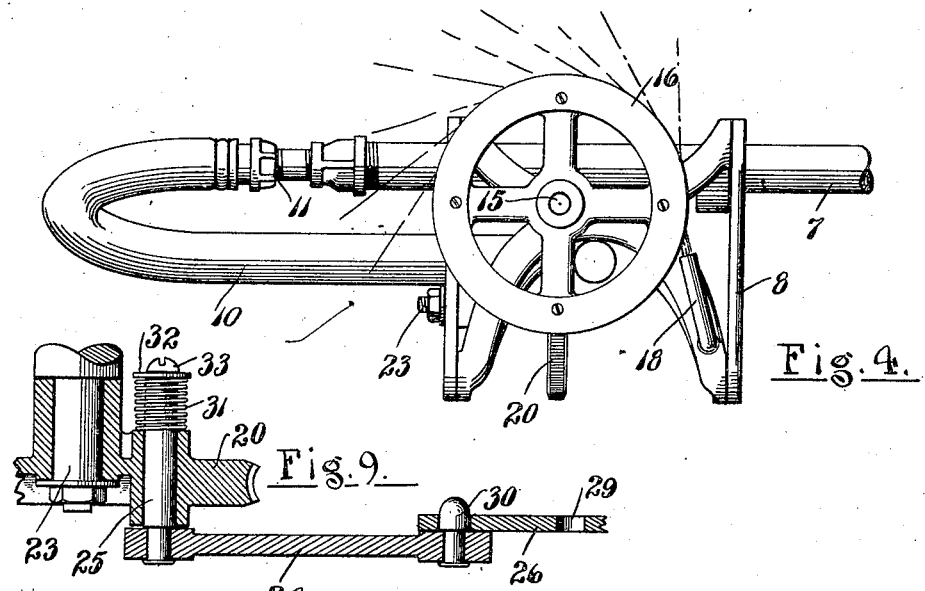
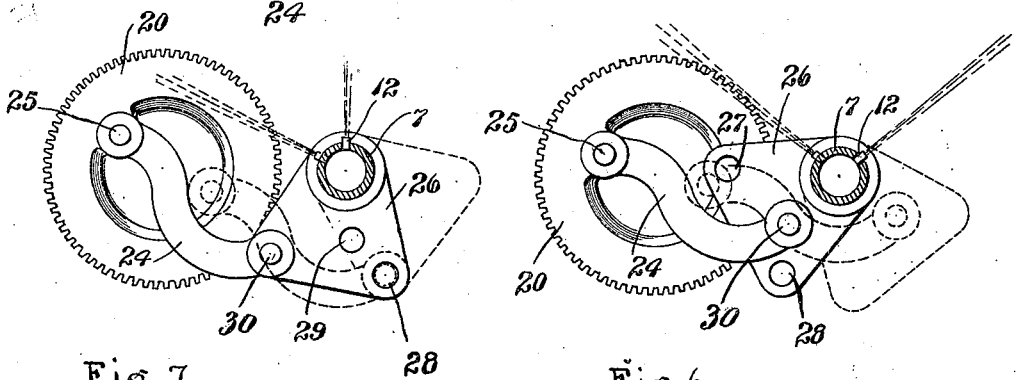
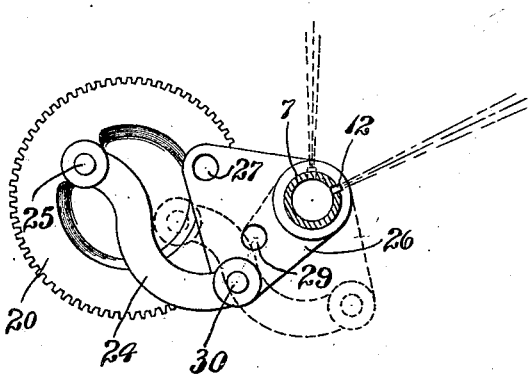
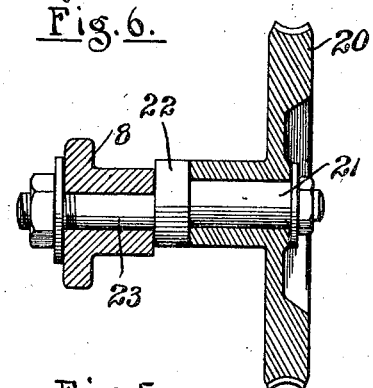

Patented Oct. 1, 1929

1,730,248

UNITED STATES PATENT OFFICE

CHARLES H. SHAFFER, OF MUSKEGON, MICHIGAN, ASSIGNOR TO AMY SHAFFER TROTT, OF MUSKEGON, MICHIGAN

LAWN SPRINKLER

Application filed February 15, 1927. Serial No. 168,250.

This invention relates to irrigation or sprinkling apparatus and is concerned primarily with apparatus of this character which, while it may be portable so that it may be readily moved to different places for irrigating different areas, is automatically actuated by power obtained from the water used for irrigation so as to turn the main water pipe, from which the jets of water escape, to different positions, the water which is used to furnish power therefor being likewise dispersed after it impinges against a water wheel which is turned through the force and velocity of the water, being sprayed outwardly on the ground and serving to sprinkle the same.

My invention is directed to the production of a simple construction of the type described and, as a further object of the invention, the automatic turning of the pipe in which the spray nozzles are mounted is controllable so that the pipe may be turned between different extreme positions. This is accomplished through a simple construction and by use thereof the spray may be at either one side or the other of a vertical plane passing through the pipe in which the spray nozzles are mounted, or the spray may pass across said vertical plane from one side to the other. It is thus possible to use my invention against the side of a house or fence or other boundary, or if there are no physical means defining a boundary, the apparatus may be used so as to spray only to the boundary of the area desired without waste of water on other portions of land which are not to be sprinkled or irrigated.

A still further object of the invention is to provide in such mechanism a novel positioning of the spray nozzles in the main water supply pipe whereby the sprays may be directed substantially fan wise to increase the range of the apparatus and better the sprinkling or irrigation which may be obtained.

Many other objects and purposes than those stated will be apparent after understanding of the invention is had from the following description taken in connection with the accompanying drawings, in which, Fig. 1 is an elevation of the apparatus of my invention.

Fig. 4 is a fragmentary plan of the water motor end of the apparatus.

Fig. 5 is a fragmentary enlarged sectional detail illustrating the mounting of the worm wheel of the apparatus and the manner in which it is adjusted with respect to the worm which drives it.

Figs. 6, 7 and 8 are elevations illustrating the means used to turn the main pipe about its longitudinal axis between different extreme positions, and Fig. 9 is a horizontal section, with parts broken away, of the worm wheel connecting link and operating lever showing details of construction.

Like reference characters refer to like parts in the different figures of the drawings.

Figure 1:
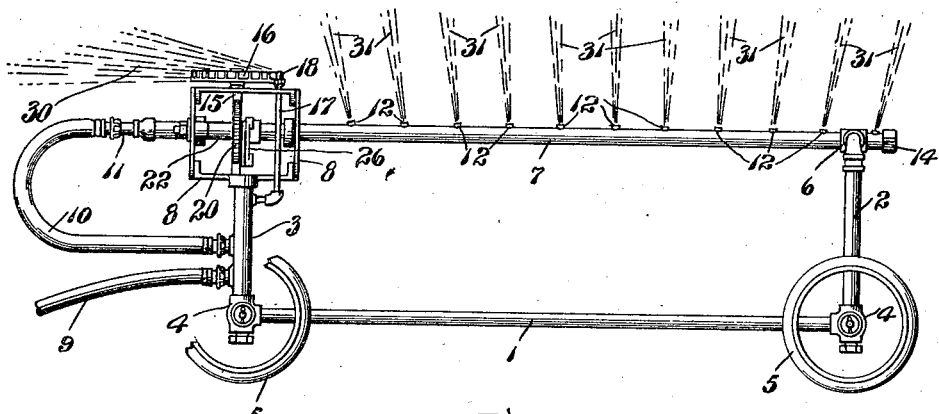
Figure 2:
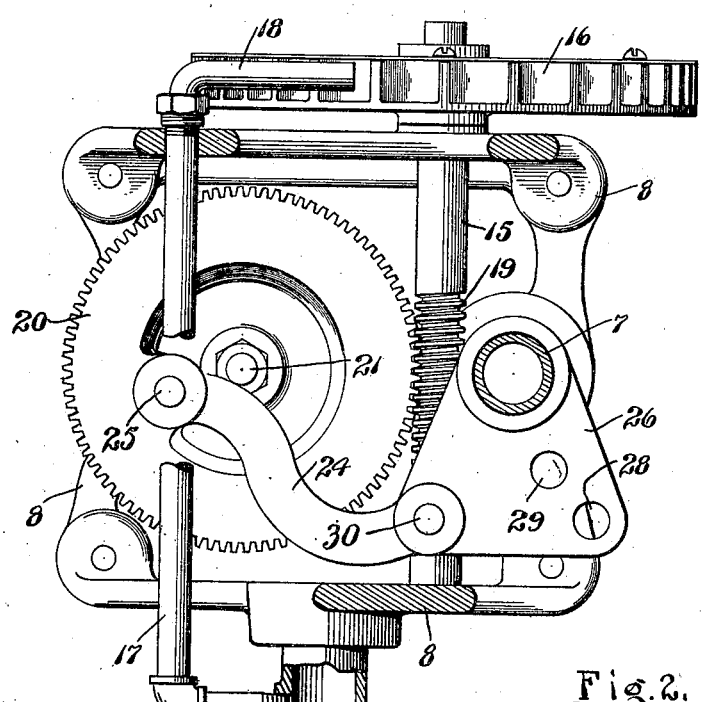
Fig. 2 is an enlarged vertical section and side elevation through the apparatus shown in Fig. 1, illustrating the manner in which the main water supply pipe is turned to different positions.

In the construction shown, the irrigating device and the control mechanism therefor are mounted so as to be portable. A carriage is provided including a lower tube or rail 1 at each end of which are provided vertical supports 2 and 3, the same being joined by suitable couplings 4; and said couplings also have connected therewith axles on which the wheels 5 are mounted, this providing a carriage for the apparatus.

At the upper end of the support 2 a head 6 is rigidly secured having a sleeve through which one end of the main irrigating pipe 7 freely passes, being mounted for rotation therein. This pipe is located horizontally over and somewhat to one side of the tube 1 and, adjacent its opposite end, is carried in suitable bearings made in a frame 8 which is fixed at the upper end of the vertical supporting tube 3. The frame 8 has spaced apart sides, top and bottom, the bottom being permanently secured at the upper end of the tube 3 which is hollow and with which a hose 9 leading to the source of water supply is connected. The water under any suitable pressure passes through the hose line 9, into the tube 3 and from the tube 3 the major portion of the water passes out through a flexible hose connection 10 which is connected to the end of the pipe 7, any suitable type of connection as indicated at 11 being used.

Figure 3:
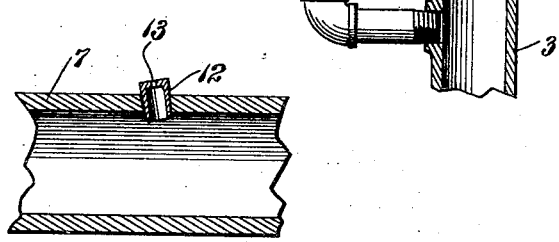
Fig. 3 is a fragmentary enlarged longitudinal section through the main water pipe showing the angular positioning of the spray nozzle and the novel construction of the nozzles in the pipe.

At spaced apart points in the length of the main pipe 7 water outlets or nozzles 12 are located, holes being bored through the pipe 7 in longitudinal alignment and the nozzles 12 pressed into said holes. Said nozzles are of the shape best shown in Fig. 3, being similar to cups, the outer sides being somewhat tapered while the closed outer end has a small opening 13 through which the water under pressure in the main pipe 7 escapes. This construction of the nozzles 12 is a feature of my invention, and a further and quite important feature of the invention is that the holes which are made in the pipe 7 are located at various angles other than a right angle to the longitudinal axis of the pipe 7. That is, while the nozzles 12 at or adjacent the middle portion of the pipe may be located at a right angle to the axis of said pipe, each nozzle away from said middle portion is disposed progressing farther away from a right angle to the axis of the pipe. This provides a fan-like distribution of the water, as indicated in Fig. 1, which could not be accomplished if all of the nozzles 12 were located at right angles to the longitudinal axis of the pipe 7. The outer end of the pipe 7 is closed by cap 14 so that water under pressure passing into the pipe 7 through the hose 10 must be forced outwardly through the small openings 13 in the nozzles 12.

It is desirable that the pipe 7 be rotated about its longitudinal axis during the time that the apparatus is in use in order that different portions of the ground may be properly irrigated. I have provided apparatus which is carried by the frame 8 to accomplish this. A vertical shaft 15 is rotatably mounted between the upper and lower sides of the frame 8 and at its upper end, above the upper side of the frame, is equipped with a water wheel 16, suitably designed that it may be turned when a jet of water impinges against it with considerable velocity. The water is supplied through a pipe 17 which joins with the upper end of the hollow standard 3 and which extends upwardly and is equipped with an outlet 18 which has its open end directed toward the wheel 16. The water passing from the outlet 18 impinges with considerable force against the wheel and turns it with its connected shaft 15. It is, of course, understood that the part 18 may be varied as to its diameter, or plugs with varying sizes of outlet holes inserted in the end of the part 18 so that a greater or less amount of water may be directed against the wheel 16 to govern the speed at which it will rotate.

The shaft 15 between its ends is equipped with a worm 19 which is in mesh with a worm wheel 20 mounted for rotation on a short stud 21 which projects from a block 22, the opposite end of said block being provided with a spindle 23 which passes through a side of the frame 8 and is rigidly connected by means of a suitable nut as shown in Fig. 5. The stud 21 is eccentrically located on the spacing block 22 with respect to the axis of the spindle 23 and it is evident that adjustment may be readily made between the worm wheel 20 and the worm 19 to compensate for any wear which may occur.

A link 24 is secured at one end to the wheel 20 by a pin 25 which passes through the wheel at a distance from its center. Rotation of the wheel 20 causes said link to reciprocate. On the pipe 7 a plate 26 of substantially triangular shape is rigidly secured near one corner or angle thereof. Adjacent the remaining corners two openings 27 and 28 are made, while a third opening 29 is made through the plate between the opening 28 and the pipe 7 to which the plate is attached. The opposite end of link 24 is detachably connected to the plate 26 at any one of the three openings 27, 28 and 29 by means of a stud 30 which projects laterally from the end of the link.

The pin 25 which passes through the wheel 20 extends a distance beyond the side of the wheel and its projecting end is surrounded by a coiled spring 31, one end of it bearing against the wheel and the other against a washer 32 which is secured to the end of the pin 25 by means of a screw 33. It is evident that by grasping the link 24 and pulling in a direction parallel to the axis of the pin 25 and stud 30, spring 31 may be compressed and the link and said pin and stud move so as to disengage the stud 30 from any of openings in plate 26 in which it may be seated. Then the stud may be seated in any other opening, the spring 31 drawing the parts back to the position shown in Fig. 9. This permits a very desirable control of the irrigation spray.

For instance, in Fig. 6 the arm 24 is shown secured to the plate 26, stud 30 being through the opening at 29. As thus connected plate 26 may oscillate between its full line position shown in Fig. 6 and the dotted line position shown in the same figure, and the nozzles 12 moved between the full and dotted line positions there shown. In such case the water dispensed will be projected substantially equal distances to each side of the vertical plane of the axis of the tube 7. In another case, as shown in Fig. 7, the stud 30 is located in the opening 27. As thus secured the nozzles 12 move only from vertical position, shown in full lines in Fig. 7, to the position shown in dotted lines at the left and the ground irrigated will all be to the left of the vertical plane of the longitudinal axis of pipe 7. When the connection is as shown in Fig. 8, that is, with stud 30 seated in the opening 28, the oscillation of nozzles 12 is from the right to the vertical and back again and the ground irrigated will all be at the right of the vertical plane mentioned. This makes it possible to bring the apparatus, either side of it, in close proximity to a building, fence or boundary line, and not waste water against the side of the building or on land which is not to be irrigated.

The structure used to effect these different oscillations of the pipe 7 is very practical and simple. It requires merely that the link 24 be grasped, pulled in the direction so as to compress the spring 31, there simultaneously occurring a disconnection of the stud 30 from any opening in plate 26 in which it is seated, and then bring the stud to a different desired opening whereupon, with release of the link 24, spring 31 draws the parts back to connecting position with the stud 30 seated in the selected opening. The change may be made almost instantly and the structure described for this purpose is considered a very valuable feature of the invention.

From the foregoing it will be understood that I have provided a practical, simple and especially effective irrigating apparatus. There is no waste water for the water which is directed against the wheel 16 is sprayed therefrom as indicated by the spray 30 in Fig. 1, serving to wet and irrigate the ground and covering ground at one end of the apparatus shown, beyond the reach of the adjacent end nozzle 12. The fan-like distribution from the nozzles 12 is very desirable. The invention has proved particularly satisfactory. It is defined in the appended claims and is to be considered comprehensive of all forms of structure coming within their scope.

I claim:

1. In a construction of the class described, a horizontally disposed pipe mounted for turning movement about its longitudinal axis and having spaced apart lateral irrigating openings, means for supplying water to the pipe, a water motor, means for supplying water to said water motor to operate the same, a link reciprocated by said water motor and means for connecting said link to said pipe at any of a plurality of points located at different radial angles relative to the axis of the pipe whereby the pipe is oscillated about its longitudinal axis on operation of the motor and capable of adjustment as to oscillation so that said lateral irrigating openings oscillate from a vertical plane to either side of said vertical plane or from one side to the other of said vertical plane.

2. In a construction of the class described, a horizontal pipe having a plurality of spaced apart lateral irrigating openings therein, a bearing at one end of the pipe in which said pipe is mounted for turning movement, a frame through which the opposite end portion of the pipe extends, said frame also having a bearing for rotatably supporting said pipe, a hollow post at the upper end of which said frame is mounted, means for supplying water to said post, a flexible hose for supplying water to the pipe from said post, a water motor mounted on said frame including a water wheel rotatable in a horizontal plane above the pipe, means for carrying water from said post and directing it against the water wheel, and means driven by said water wheel and connected with the pipe for oscillating said pipe about its longitudinal axis.

3. In a construction of the class described, a pipe mounted for turning movement about its longitudinal axis and having a lateral irrigating opening, a water motor for turning the pipe including a rotating crank, a member extending from the pipe, a link connected at one end to the crank at a distance from its axis, and means for connecting the opposite end of the link to said member at any one of several different points located at different radial angles relative to the axis of the pipe whereby the pipe may be oscillated about its longitudinal axis in different arcs of a circle.

4. In a construction of the class described, a pipe mounted for turning movement about its longitudinal axis and having irrigating vents therein, a water motor for turning said pipe including a rotatably mounted wheel, means for supplying water to the pipe, means for supplying water to the motor to actuate the same, a plate attached to the pipe having a plurality of spaced openings therethrough located at different radial angles relative to the axis of the pipe, a link connected at one end to said wheel a distance from its center, a stud projecting from the opposite end of the link adapted to fit any of the openings in said plate, and spring means associated with the link normally holding the same against the wheel and the stud in any opening in which it is located, said spring means being yieldable so that the link and stud may be moved bodily to disengage the stud from any opening in the plate for reengagement in any of the other of said openings.

5. In a construction of the class described, a horizontally disposed pipe mounted for turning movement about its longitudinal axis and having lateral irrigating openings therein, a water motor for turning said pipe including a rotatably mounted wheel, means for supplying water to the pipe, means for supplying water to the motor to actuate the same, a plate attached to and extending from the pipe having a plurality of spaced openings therethrough located at different radial angles relative to the axis of the pipe, a link, a pin attached to one end of the link and extending through said wheel a distance from its center, a stud attached to the opposite end of the link of a size to fit any of the openings in said plate, a spring around said pin on the side of the wheel opposite the link, and means on the end of the pin between which and the wheel the spring is compressed to thereby releasably hold the link against the wheel and said stud in any opening in which it may be placed.

6. In a construction of the class described, a horizontally disposed pipe mounted for turning movement about its longitudinal axis and having lateral irrigating openings therein, a water motor for turning said pipe including a rotatably mounted gear wheel, means for supplying water to the pipe, means for supplying water to the motor to actuate the same, a plate attached to the pipe having openings therethrough located at different radial angles relative to the axis of the pipe, a link, a pivot pin at one end thereof and a stud at the opposite end forming a unit attached to said wheel a distance from its center, said pin passing through the wheel, and said stud and of a size to fit any of the openings in said plate, and yielding means normally holding the link against the wheel and the stud in any opening in which it is placed, said means yielding on application of force whereby the link, stud and pin may be moved together in a direction to disengage the stud from an opening in which it may be located and permit its re-engagement in another opening in the plate, said yielding means tending to force the stud in any opening to which it is brought.

7. In a construction of the class described, a pipe mounted for turning movement about its longitudinal axis, a motor for turning the pipe including a rotating crank, a member extending laterally from the pipe, a link connected at one end to the crank, and means for connecting the opposite end of the link to said member at any one of a plurality of points located at different radial angles relative to the axis of the pipe whereby the pipe may be oscillated about its axis in different arcs.

8. In a construction of the class described, a pipe mounted for turning movement about its longitudinal axis, a motor for turning the pipe including a rotating crank, a member extending laterally from the pipe, a link connected at one end to the crank, and means for connecting the opposite end of the link to said member at any one of a plurality of points located at different radial angles relative to the axis of the pipe, one of said points being closer to the axis than other of said points, whereby the pipe may be oscillated about its longitudinal axis in different arcs of a circle and to a varying extent in said different arcs.

In testimony whereof I affix my signature.

CHARLES H. SHAFFER.